Dec. 5, 1939.   H. HAMEL   2,182,229
ELECTRIC TOASTER
Filed Jan. 28, 1938   3 Sheets-Sheet 3
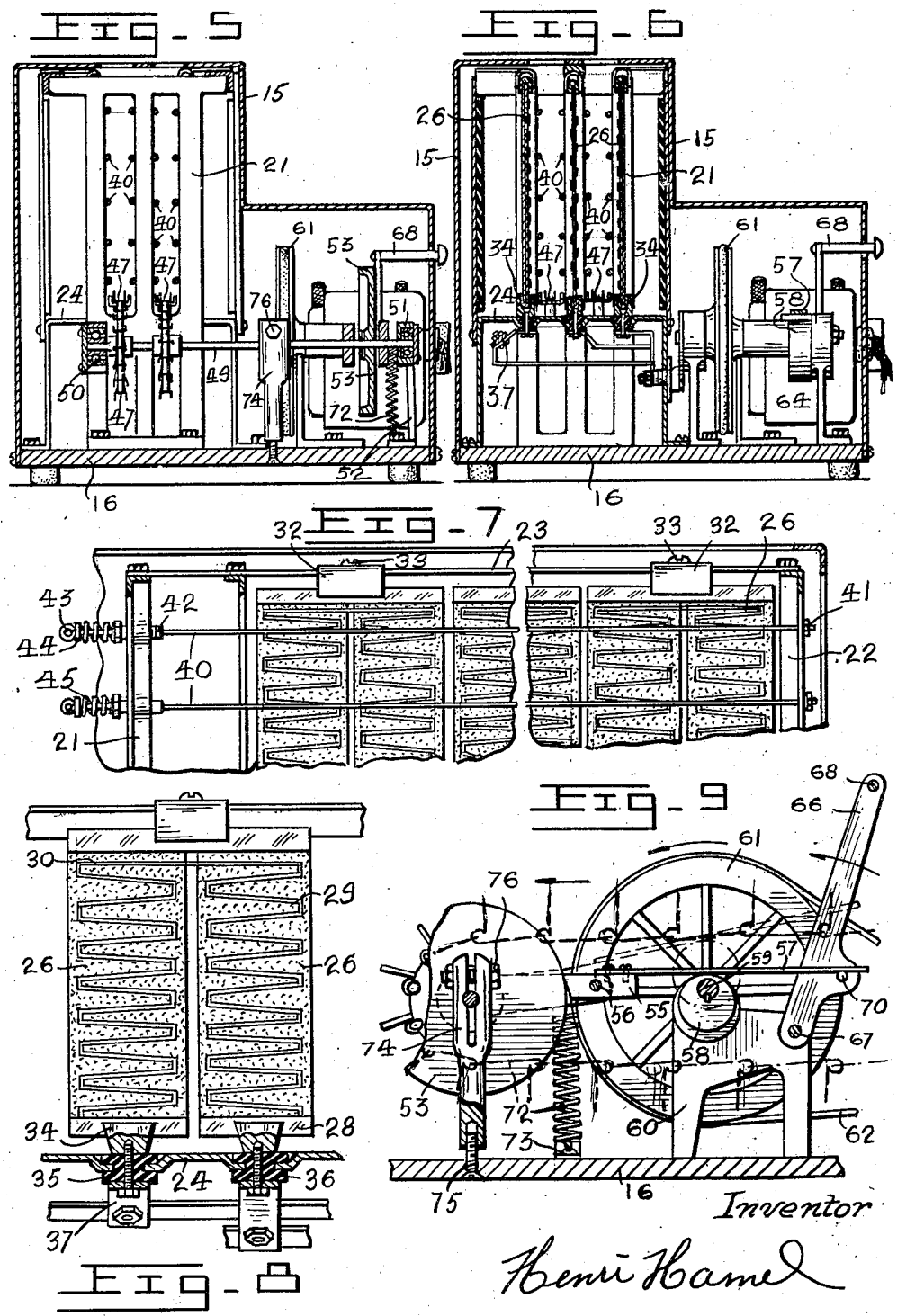
Inventor
Henri Hamel Patented Dec. 5, 1939

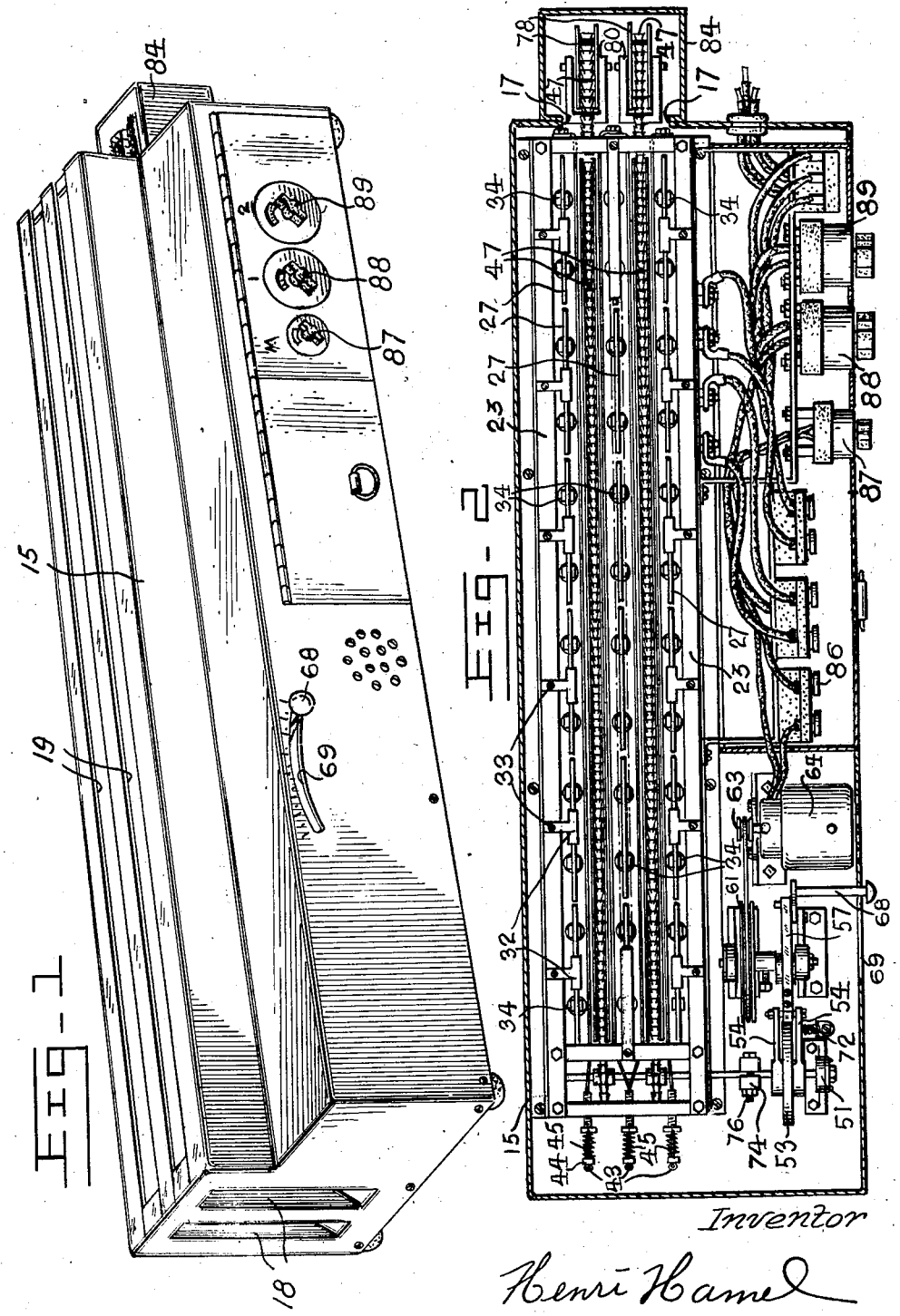

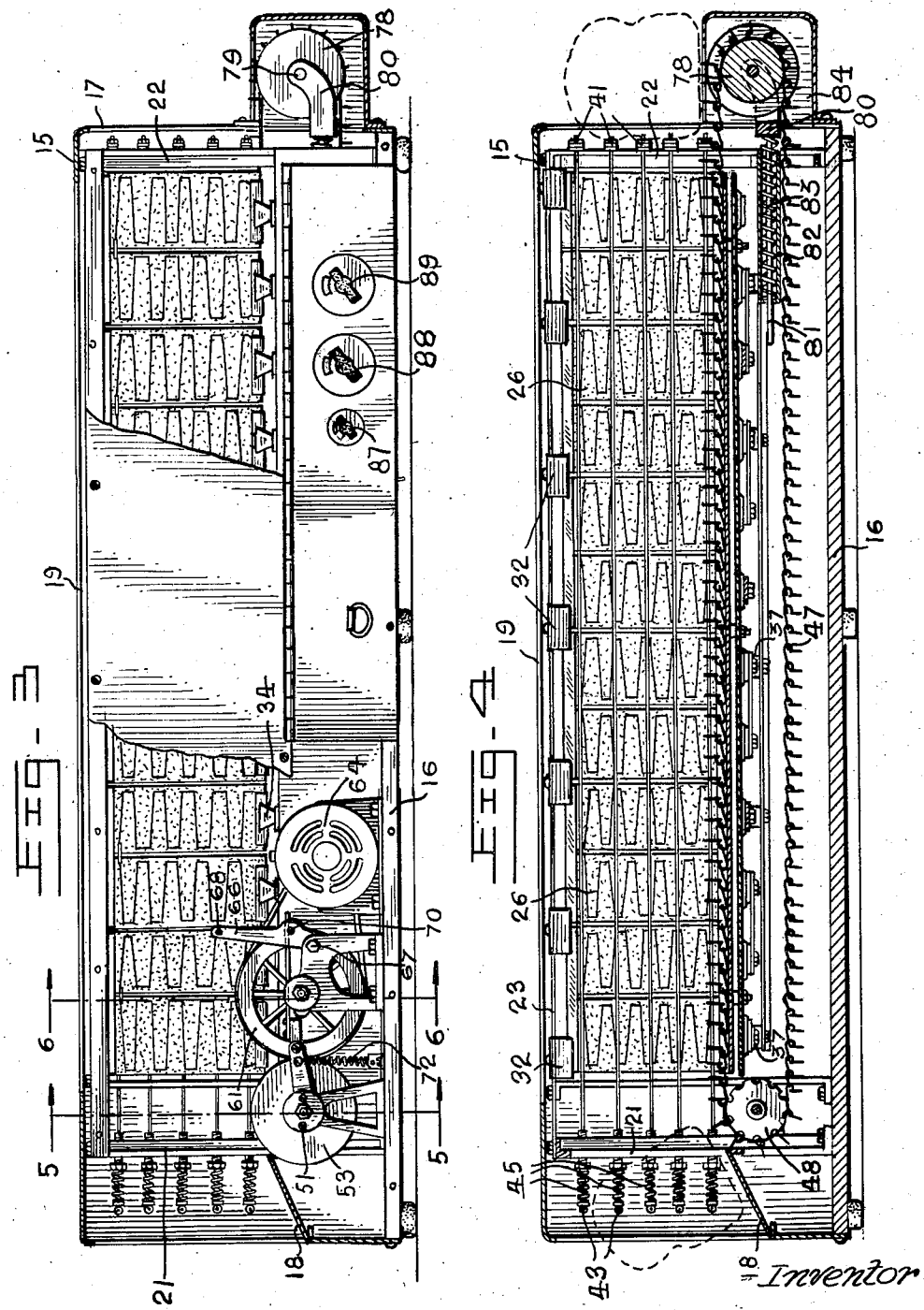

2,182,229

UNITED STATES PATENT OFFICE 2,182,229

ELECTRIC TOASTER

Henri Hamel, St. Jerome, Quebec, Canada

Application January 28, 1938, Serial No. 187,468

2 Claims. (Cl. 53—5)

This invention relates to an improved toaster construction.

An important feature of my invention is to provide a toaster designed so that the movement of the material to be toasted through the machine may be very accurately regulated.

Another feature of my invention is to provide a toaster constructed so that bread or other material will be toasted in a very efficient manner.

Another feature of my invention is to provide a toaster which is capable of toasting a relatively large quantity of material in a comparatively short period of time.

Another feature of my invention is to provide a toaster having heating elements in the form of sectional units which may be replaced very easily and at a comparatively low cost.

Another feature of my invention is to provide a toaster which is very efficient and reliable in operation.

Other objects and advantages will hereinafter appear.

In the drawings which show, for illustrative purposes only, a preferred form of the invention:

Figure 1 is a perspective view of the assembled toasting machine.

Figure 2 is a horizontal section through the same,

Figure 3 is a side elevational view with the side wall partly broken away to illustrate interior construction, Figure 4 is a vertical longitudinal section through the machine, Figure 5 is a transverse section taken on the line 5—5 of Figure 3, Figure 6 is a transverse section taken on the line 6—6 of Figure 3, Figure 7 is a fragmentary longitudinal section of the interior of the machine, Figure 8 is a fragmentary section showing one of the heater units in operative assembly, and Figure 9 is a fragmentary elevation showing part of the actuating mechanism.

In the said drawings, 15 generally designates the casing of the machine which is in the form of an elongated rectangular shaped shell of sheet metal or the like secured to a heavier base plate 16. In one end wall of the casing are provided a pair of vertically elongated feed slots 17 while in the opposite or rear end are formed similarly shaped discharge slots 18. In the top of the casing are provided a pair of longitudinally extending vent slots 19.

Mounted vertically within the end portions of the casing and secured to the base are a pair of vertically elongated slotted frame sections 21 and 22. Rigidly connected to these sections and extending horizontally therebetween are a plurality of top frame bars 23. To the lower portions of the frame sections are securely fastened the end portions of an elongated plate 24 extending longitudinally between the sections in horizontal position to form a bottom plate for toasting passages in the casing.

Mounted vertically in the frame structure so as to provide longitudinally extending passage walls are a plurality of heater units each composed of a pair of rectangular elongated panels 26, of mica or the like, connected by a unitary channel shaped metallic top strip 27 and having similarly formed strips 28 attached to the bottom of each panel. On each of the panel forming sheets of the unit is mounted a coil 29, preferably of flat wire, adapted to provide a resistance heating wire. At the top, the two coils of the unit are joined by a connecting transverse wire 30 while the two bottom ends connect to the bottom strips 28. The upper end of each unit is detachably connected with one of the longitudinal top frame bars 23 by means of a U-shaped fastening clip 32 adapted to straddle one of the top bars and the upper strip 27 of the unit and connected with the top frame structure by a screw 33. The bottom ends of each unit are connected with the bottom forming plate 24 by U-shaped fastening clips 34 attached to the plate by screws 35 and insulated therefrom by means of insulating washers 36. To the bottom end of each screw 35 is connected a conducting contact strip 37. These units are thus assembled in edge to edge relation to form three heating walls extending lengthwise in the casing and defining two toasting channels therein. By reason of their assembly, any unit may be easily and quickly replaced so as to enable low cost repair of the injured or burnt out resistance wires.

Extending lengthwise within the toasting channels so as to prevent contact of the toasted material with the heating elements are a plurality of guide or grid wires 40, arranged in vertically spaced position, having the forward ends extended through apertures in the front frame section 22 and rigidly held in place by a nut 41 threaded on the projecting ends of each wire. The opposite or front end of each of the guide wires 40 extends horizontally through a sleeve 42 threaded in the rear frame section 21 and is formed with a loop 43 adjacent which is mounted a collar 44. Coiled about the rearwardly projecting end of each of the wires 40, between the collar 44 and the rear end portion of the sleeve 42, is a coiled compression spring 45 which acts to resiliently retain the wire in tightly stretched arrangement and to obviate warping by the heat from the heating coils.

The material to be toasted is carried through the relatively narrow longitudinally extending toasting passages by means of a pair of endless conveyor chains 47 equipped with projecting prongs adapted to frictionally engage the toasted material. These conveyor chains, mounted one in each passage, are arranged vertically and extend longitudinally in the casing.

At one end, the chains are trained over notched drive wheels 48 keyed or otherwise fixed upon a transversely extending shaft 49. One extremity of the shaft 49 is journalled in a bearing 50 supported on the rear frame section 21, while the opposed end is journalled in a bearing 51 supported on a frame standard 52. On this shaft 49, at a position spaced transversely from the drive wheels 48, is securely mounted a wheel 53 in the form of a metallic disc formed with a peripheral flange. Loosely supported on the shaft 49 at each side of the wheel 53 are a pair of radial arms 54 having their outer end portions pivotally connected to a block 55 by a pivot pin 56. The block 55 is connected to the inner end portion of a complementary arm 57 disposed so that the arms 54 and 57 provide an articulated lever assembly. The arm 57 is arranged to extend above and to receive motion from a disc 58 keyed eccentrically to a shaft 59 to provide an actuating cam. The shaft 59 is journalled transversely in a support frame structure 60 and also carries thereon a relatively large pulley wheel 61 keyed or otherwise fastened to the shaft at a position spaced from the cam forming disc 58. A drive belt 62 is trained over the pulley 61 and is also trained over the pulley of a drive shaft 63 of an electric drive motor 64.

A rigid elongated lever 66 is mounted so that one end is connected by a pivot pin 67 to the frame 60 for vertical swinging movement. To the outer end of the lever 66 is connected a laterally projecting crank arm 68 arranged so that the outer portion projects through an arcuate slot 69 in one side wall of the casing. At the intermediate portion of the lever 66, adjacent its inner pivoted end, is secured a transversely projecting fixed pin 70 disposed so that it may be positioned to intercept the outer end portion of the arm 57 for limiting the downward movement thereof.

As will be noted, the block 55 is mounted so that an end portion is adapted to frictionally engage the periphery of the wheel 53. Thus, operation of the electric motor 64 will effect rotaton of the shaft 59 through the medium of the pulley 61 so as to rotate the vertical cam disc 58. This movement of the cam is adapted to effect vertical oscillation of the arm 57 and the complementary arms 54 so that during upward movement of these arms the lever assembly formed thereby assumes nearly a straight line position with the result that the outer inclined face of the block 55 tightly engages the periphery of the wheel 53 and causes this wheel to rotate through a predetermined arc together with the articulated lever. When the cam swings downwardly it permits corresponding downward movement of the articulated lever and the block is lowered without affecting movement of the wheel 53 in a manner to be explained further on so that the mechanism will operate the wheel 53 in step by step movement, in a counter-clockwise direction, as shown at Figure 9. Angular adjustment of the lever 66 is adapted to regulate the operation of the conveyor wheel driving the mechanism by controlling the movement effected during each successive step.

As is clearly illustrated at Figure 9, an arrangement of the lever 66 at a predetermined angular position disposes the pin 70 so that the arm 50 is free to move through the arc corresponding to the complete throw of the cam. When, on the other hand, the lever is raised to an approximately vertical position, the pin 70 thereon will limit the downward movement of the arm 57 so that the latter is precluded from descending to the full throw of the cam but is only actuated by the latter during a portion of its elevated movement. This decreases the arcuate oscillatory movement of the articulated lever and the corresponding arcuate step by step movement of the wheel 53 and the conveyor drive wheels and correspondingly reduces the operating speed of the conveyor chains.

In order to assure effective operation and gripping of the block 55, a coiled tension spring 72, attached to the base of the casing by a bracket 73, is connected with one of the arms 54 so that it exerts a toggle action on the articulated lever. Also, to maintain positive action, a split clamp 74 is mounted to frictionally engage the shaft 49 and is attached to the base by a screw 75, the clamp being provided with a tightening screw 76 so that the clamp may be compressed at suitable pressure to exert suitable friction on the shaft.

At the front end, each of the conveyor chains 47 is trained over an idler wheel 78 mounted on a shaft 79 journalled in a U-shaped bracket 80. Each of the brackets is formed with an elongated stem 81 arranged within a tube 82. A coiled compression spring 83, disposed so that one end bears aganst a flange at the rear end of the tube and against the bracket 80, acts to resiliently urge the brackets and the idler wheels forwardly to maintain the conveyor chains in resiliently stretched condition. As shown in the drawings, the conveyor idler wheels may be disposed within an extension housing 84 projecting forwardly from the main casing.

The wiring connections between the motor and the resistance coils connect with fuse elements 86 and with switches 87, 88 and 89, so that the conveyors and the heating units for the respective toasting passages may be independently operated.

As will be readily apparent, this construction provides a toaster which is very efficient in operation and which enables regulation for toasting bread or other material to the desired degree. Furthermore, the means for accurately controlling the speed of the conveyors in the intermittent or step by step operation thereof will enable efficient toasting of bread which is in a dry or stale condition, or which is very fresh.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:

1. In a toaster of the endless chain type, means for actuating an endless chain comprising: a source of motive power, an eccentric cam continuously operated by said source of power, a pulley over which the endless chain is trained at one end, a pivoted lever, a block pivoted to said lever adapted to engage the rim of the pulley, an extension on said block engageable by the cam, means for urging the pivoted lever downwardly, and manually operated means for limiting the downward movement of the extension over the cam.

2. In a toaster having independently removable heater units and an endless conveyor chain to move material to be toasted, pulleys over which the conveyor chain is trained, a motor for continuously rotating an eccentric cam, a pivoted toggle for unidirectionally moving one of the chain pulleys, said toggle having a cam engaging extension for actuation, a spring for downwardly urging the toggle, a friction clamp for preventing retractive movement of the pulley by the toggle, and a manually actuated stop pin for limiting the downward movement of the extension over the cam.

HENRI HAMEL.